March 12, 1968 V. L. NEWHOUSE ETAL 3,373,410

SENSING SYSTEM FOR AN ARRAY OF FLUX STORAGE ELEMENTS

Filed Dec. 24, 1964

Inventors:
Vernon L. Newhouse;
Raoul E. Drapeau,
by John P. Dellitt
Their Attorney.

United States Patent Office 3,373,410
Patented Mar. 12, 1968

3,373,410
SENSING SYSTEM FOR AN ARRAY OF FLUX STORAGE ELEMENTS

Vernon L. Newhouse, Scotia, and Raoul E. Drapeau, Troy, N.Y., assignors to General Electric Company, a corporation of New York
Filed Dec. 24, 1964, Ser. No. 421,021
7 Claims. (Cl. 340—173.1)

ABSTRACT OF THE DISCLOSURE

A system for sensing data stored in an array of storage elements wherein a plurality of conducting strips, each strip wider than any storage element, are situated on one side of the array in alignment with the elements. The strips are spaced close to each other to minimize the amount of undetected flux, and are connected in series to detect voltages induced therein by flux changes in any of the elements. A second plurality of strips may be similarly connected to cover the gaps between the strips of the first plurality and detect flux changes in the gaps.

Figure 1:
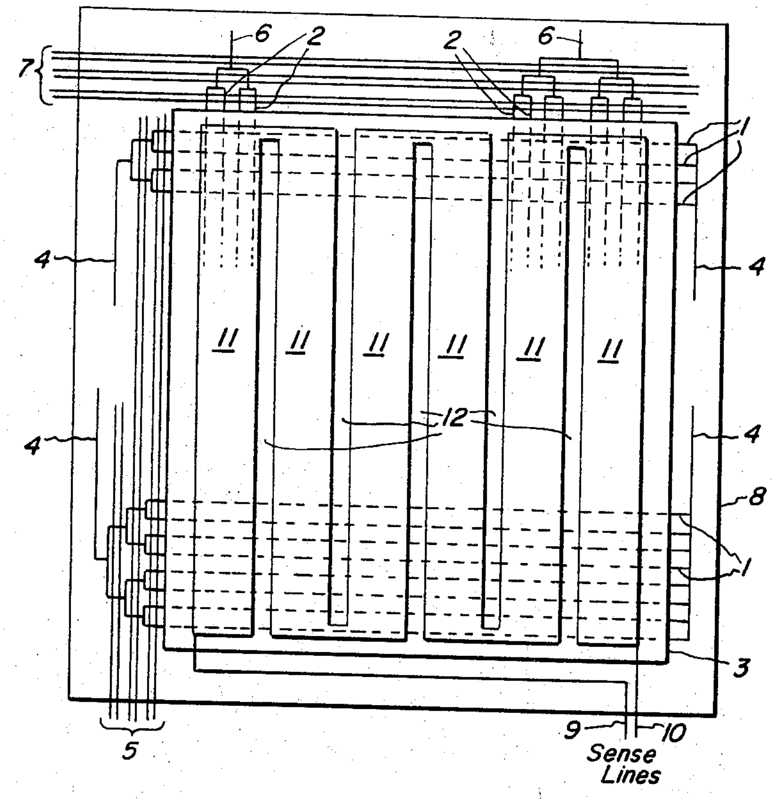

This invention relates to computer memories and particularly to a memory sensing system for high density computer memories.

Superconductive and magnetic memories contain arrays of flux storage elements or sites each of which are intersected by two selection lines used to switch flux, and one sense line used to detect flux changes. The need to have three lines intersect at many storage locations produces severe alignment problems especially in the fabrication of high density deposited film memories and the like. This problem has been solved in part by disposing a continuous conductive sense plane adjacent to the memory array. The plane takes the place of the circuitous sense line in the usual memory. However, the amplitude of the sense signal provided by such a sense plane is quite small for some element locations and is strongly a function of the location of the particular storage element relative to the sense plane.

It is therefore an object of the present invention to provide an improved memory sensing system producing signal output which is substantially uniform regardless of the relative position of the particular memory element producing the sense signal, but wherein the high degree of alignment is not required between the memory elements and the sensing system.

It is another object of the present invention to provide a memory sensing system having the advantages of continuous sense plane construction while producing a higher and more uniform output sense voltage.

In accordance with the present invention, a sensing system comprises a flat but relatively narrow conductive sensing strip which passes back and forth over the elements of a memory array in serial fashion. Each pass of the sensing strip is separated by a narrow gap from the previous pass to provide insulation therebetween, maintaining the series circuit without leaving an appreciable space where memory flux might go undetected. In the case of a planar continuous film memory, the sensing strip takes the form of a plurality of narrow strips disposed in a common plane opposite the memory plane of the continuous film memory, with means connecting the plurality of strips in series located at alternate ends of said strips whereby to provide a common output signal. The strips have one dimension substantially equal to that of the memory plane of the continuous film memory but are quite narrow in width. It is found the foregoing configuration is much less sensitive to the position of a particular memory element than in the case of a unitary continuous sense plane.

In accordance with one aspect of the present invention, a pair of serially connected sensing strips are superimposed with respect to one another with one displaced with respect to the other in a direction across the strips whereby each serial strip covers the gaps in the other. The output of each is coupled to an amplifier and the amplifier outputs are summed to attain a common output. In this manner, there is no opportunity for a memory flux change from any of the memory elements to go undetected.

Figures 2, 3:
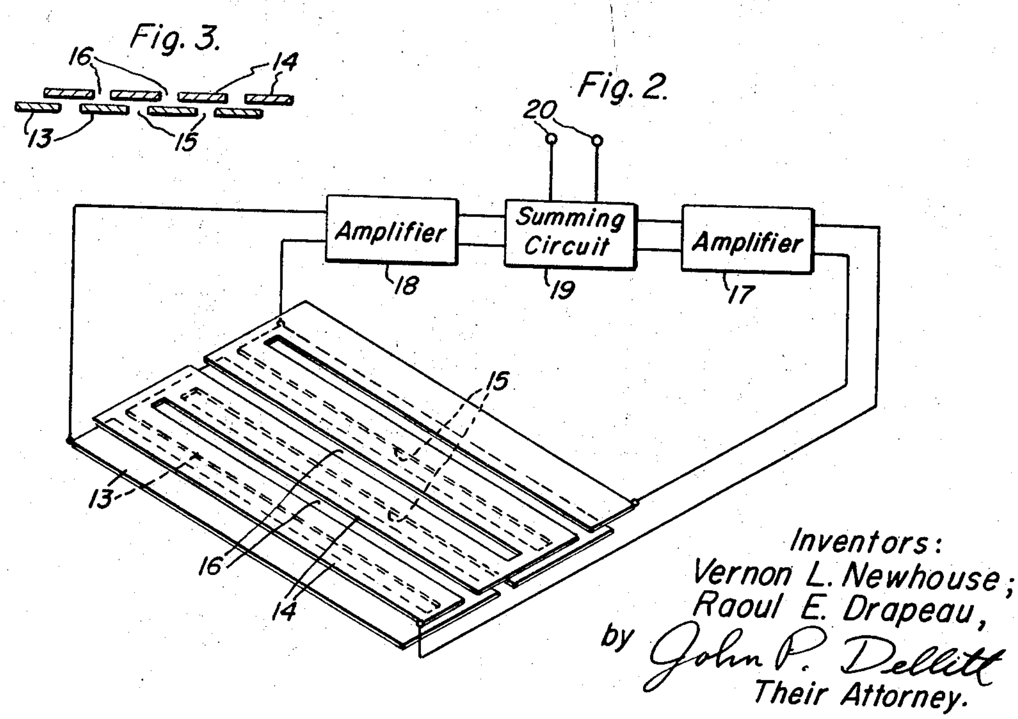

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a schematic plan view of a computer memory plane including a memory sensing system in accordance with the present invention, FIG. 2 is an isometric view and output circuit of a memory sensing system according to another embodiment of the present invention, and FIG. 3 is a cross-sectional view of a memory sensing system as illustrated in FIG. 2.

Cryogenic and magnetic random memory access memories and the like store information in terms of the flux state of individual storage elements. Each storage location is intersected by two or more drive lines and by a sense line. The sense line exhibits a voltage pulse when the flux of any storage element location linking it is switched. In large capacity, high density memories, the use of sense lines which must intersect many storage element locations poses severe alignment problems and leads to undesirable signal delay.

An exemplary type of memory structure, known as a continuous film cryogenic memory structure, is illustrated in FIG. 1. In this figure, orthogonal sets of drive lines, namely, $x$ lines designated by the reference numeral 1 and $y$ drive lines designated by the reference numeral 2, are superimposed on the reverse side of a superconducting tin storage film 3 and the latter is maintained in a superconducting state by refrigeration means not shown. Storage of a memory bit occurs by "trapping" flux in the tin film 3 at the junction locations of particular energized $x$ lines and $y$ lines. The $x$ lines are provided current via conductors 4 and a particular $x$ line is selected with an address switching means 5 superimposed in cryotron relation with respect to the $x$ lines 1 in a manner understood by those skilled in the art. Similarly, $y$ lines, 2, are supplied current via conductors 6 and a particular $y$ line is selectively energized by means of an address switch 7. The entire arrangement may be deposited in the form of a plurality of thin films of the printed circuit type upon a common insulating substrate 8.

Heretofore, memories of this type have been read out by detecting flux changes at the intersection of each $x$ line and y line by means of a circuitous conductor passing the junction of each x line and y line, or alternatively by means of a continuous conducting sense plane covering the entire memory and usually located upon the opposite side of tin film 3 from the x lines and y lines. The latter sensing arrangement, while not as sensitive to mis-alignment between the sensing means and the x and y line intersections as in the case of a circuitous sense line, nonetheless poses other serious disadvantages. In a practical random access memory system or the like, it is desirable that the sense signal amplitude be independent of the memory element position in the memory array. Unfortunately, in the case of a continuous sense plane, the signal amplitude varies strongly with the position of the storage element location, that is with the location of a particular x and y line intersection. Thus if output conductors are connected to opposite edges of a continuous sense plane, then as the element is moved from the center of the sense plane towards either edge, the output voltage increases markedly. The voltage is quite small for a location near the center of the plane. The strong dependance of signal strength on flux source position which holds for this continuous sheet sense plane geometry is found to be much less than optimum for use in a memory.

To avoid the foregoing problems, the output sensing means in accordance with the present invention comprises a long narrow sensing strip passing back and forth across the memory elements or locations, forming a series output sensing system connected to output sense lines 9 and 10 in FIG. 1 at either end thereof. The sensing strip is flat or planar and is disposed immediately adjacent the memory elements or locations to sense flux change which may occur therein when a particular element or location is read out. The sensing strip is long and narrow extending across a plane of the memory from one side to the other, then returning to the first side in zig-zag fashion.

Referring to FIG. 1, the output sensing means may be referred to as a plurality of flat narrow sensing strips 11, extending in the same direction across the memory, with means provided alternately at first and second ends of said strips to connect the strips in series. The strips are preferably rectangular with a narrow width dimension. The memory strips are located, and preferably deposited, on one side of memory film 3 while being insulated therefrom, with the x and y drive conductors located on the opposite side of the memory film as illustrated. The long narrow sensing strip is found to be much less sensitive to flux source or memory element position than a square sense sheet. Moreover this configuration is not nearly as placement-sensitive as a circuitous sense wire, but at the same time the output sense signal is larger than, as well as not as position-dependent, as in the case of the continuous sensing plane.

The strips, 11, are insulated and separated from one another by gaps 12 in FIG. 1, to establish the long narrow geometry of the strips and the series connection thereof. However, in the drawing of FIG. 1, the gaps are exaggerated for purposes of clarity. In practice, the gaps are as narrow as fabrication techniques permit. Thus, very litle area is present between the strips wherein sensing may be absent or alignment difficult.

A second embodiment of the present invention is illustrated in FIG. 2, wherein a first sensing strip 13 of the type described is superposed by a second such strip 14. The second strip 14 is displaced relative to 13 in a direction across the gaps therebetween so that strip 14 covers gaps 15 thereof. The disposition of the strips is more clearly illustrated in the cross-section of FIG. 3. Also, the gaps 15 are, of course, compensated for with sensing strip 13. The ends of strip 13 provide input to an amplifier 17 while strip 14 is similarly connected to an amplifier 18. The amplifier outputs are coupled to a common summing circuit 19 providing a common output at terminals 20 representing the sum of the output signals produced by strips 13 and 14. In this embodiment, the output sensing means is completely insensitive to memory element or location position.

While we have shown and described several embodiments of our invention, it will be apparent to those skilled in the art that many changes and modifications may be made without departing from our invention in its broader aspects; and we therefore intend the appended claims to cover all such changes and modifications as fall within the true scope and spirit of our invention.

What we claim as new and desire to secure by Letters Patent of the United States is:

1. A memory system comprising a plurality of storage elements for storing individual bits of information, an array of conductors leading to said storage elements wherein said conductors are employed to enter information into said elements and define the location of said elements, sensing means disposed adjacent said array comprising a plurality of conducting strips separated by narrow gaps therebetween, each of said strips being of sufficient width to overlap each of said storage elements in alignment therewith, and means connecting said strips in series to provide a readout for signals induced in said sensing means by flux changes in said array.

2. A memory array comprising a plurality of memory elements located in substantially a common plane, a plurality of conductors for reading information into said memory elements and which define the location thereof, readout means comprising a plurality of substantially flat, narrow metal strips located adjacent one another in substantially a common plane facing said memory array with narrow gaps between said metal strips, each of said strips being of sufficient width to overlap each of said memory elements in alignment therewith, and means connecting said metal strips in series to provide a readout for signals induced in said readout means by flux changes in said memory array.

3. A memory array comprising a plurality of memory elements located in substantially a common plane, a plurality of conductors for reading information into said memory elements which define the location thereof, readout means comprising a plurality of flat, rectangular metal strips having a first dimension extending substantially across said array and a second narrow dimension, said strips being located closely adjacent one another in a common plane juxtaposed with respect to said array, each of said strips being of sufficient width to overlap each of said memory elements in alignment therewith, and means connecting said strips together on alternate ends thereof to provide a series connection of said strips for reading information signals induced in said readout means by flux changes in said array.

4. A memory array comprising a plurality of memory elements located in substantially a common plane, a plurality of conductors for reading information into said memory elements and which define the location thereof, readout means comprising long, narrow, flat conducting strips located in a plane closely adjacent said array, said strips extending back and forth across said array, each of said strips being connected together at alternate ends to form a series connection of said strips and being closely adjacent each other and of sufficient width to overlap each of said memory elements in alignment therewith, and means connected to the unconnected ends of said strips to provide a readout of signals induced in said readout means by flux changes in said array.

5. A memory array comprising a plurality of memory elements located in substantially a common plane, a plurality of conductors for reading information into said memory elements and which define the location thereof, readout means comprising a first plurality of conducting strips extending in a first direction across said array having narrow gaps therebetween and connected in series to provide a readout for said memory array, each of said strips being of sufficient width to overlap each of said memory elements in alignment therewith, a second plurality of strips also extending in substantially the same direction across said array and also connected in series for providing readout of said array, said second plurality of strips being offset with respect to said first plurality of strips to cover the gaps between said first plurality of strips, and means coupling both said first plurality of strips and said second plurality of strips to a common summation means providing an output signal for said array equal to the sum of the signals induced in said first and second pluralities of strips.

6. A memory array comprising a memory plane having locations thereof for storing information, a plurality of conductors located on one side of said plane for entering information into said locations and defining said locations, readout means on the opposite side of said memory plane comprising a plurality of long, narrow, flat conducting strips adjacent said memory plane and narrowly spaced apart from one another, each of said strips extending across said memory plane, and being of sufficient width to overlap each of said locations in alignment therewith, and means connecting said strips in series to provide a readout for signals induced in said readout means by flux changes in said memory array.

7. The memory array according to claim 6 wherein said memory plane is superconducting material refrigerated to a temperature where it exhibits superconducting properties.

References Cited

UNITED STATES PATENTS

| | | | |
|---|---|---|---|
| 3,172,086 | 3/1965 | Wendt | 340—173.1 |
| 3,196,416 | 7/1965 | Williams | 340—174 |
| 3,259,887 | 7/1966 | Carwin | 340—173.1 |
| 3,263,220 | 7/1966 | Crowe | 340—173.1 |

BERNARD KONICK, *Primary Examiner.*

J. F. BREIMAYER, *Assistant Examiner.*